(12) United States Patent
Kiryu et al.

(10) Patent No.: US 10,700,567 B2
(45) Date of Patent: Jun. 30, 2020

(54) STATOR FOR MOTOR

(71) Applicant: YAMADA MANUFACTURING CO., LTD., Kiryu-shi, Gunma (JP)

(72) Inventors: Daisuke Kiryu, Kiryu (JP); Satoshi Watanabe, Kiryu (JP); Masahiko Hoshino, Kiryu (JP)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 6 days.

(21) Appl. No.: 16/276,817

(22) Filed: Feb. 15, 2019

(65) Prior Publication Data

US 2019/0305624 A1    Oct. 3, 2019

(30) Foreign Application Priority Data

Mar. 27, 2018  (JP) ................................. 2018-059243

(51) Int. Cl.
*H02K 11/00* (2016.01)
*H02K 3/38* (2006.01)
*H02K 3/52* (2006.01)

(52) U.S. Cl.
CPC .............. *H02K 3/38* (2013.01); *H02K 3/522* (2013.01)

(58) Field of Classification Search
CPC .......... H02K 5/225; H02K 3/522; H02K 3/50; H02K 5/08; H02K 2203/06; H02K 2203/12; H02K 3/38; H02K 2203/03
USPC ................................................... 310/71, 194
See application file for complete search history.

(56) References Cited

U.S. PATENT DOCUMENTS

| | | | | |
|---|---|---|---|---|
| 7,635,933 B2 * | 12/2009 | Makino | ................... | H02K 3/522 310/68 B |
| 9,797,749 B2 * | 10/2017 | Miyao | ................... | G01D 5/2046 |
| 2007/0040461 A1 * | 2/2007 | Oohashi | ................ | H02K 3/522 310/71 |
| 2007/0205679 A1 * | 9/2007 | Terauchi | ................ | H02K 3/522 310/71 |
| 2008/0122301 A1 * | 5/2008 | Okada | .................... | H02K 3/522 310/43 |
| 2008/0169713 A1 * | 7/2008 | Kataoka | ............... | G01D 5/2013 310/71 |
| 2014/0028129 A1 * | 1/2014 | Jo | ......................... | H02K 3/522 310/71 |

(Continued)

FOREIGN PATENT DOCUMENTS

| | | |
|---|---|---|
| DE | 112008001219 B4 | 6/2017 |
| EP | 1947754 B1 | 11/2016 |
| EP | 2798727 B1 | 3/2017 |

(Continued)

OTHER PUBLICATIONS

German Search Report dated Jan. 21, 2020, with explanation in English from German associate, 10 pages.

*Primary Examiner* — Thanh Lam
(74) *Attorney, Agent, or Firm* — Rankin, Hill & Clark LLP

(57) ABSTRACT

An insulator constituting a stator for a motor includes an extension portion that extends from a portion of a circumferential wall portion toward a plurality of terminals conforming to an axis line of the stator. A sealing member includes a cut-out hole in between an adjacent pair of the plurality of terminals, the cut-out hole being a through-hole extending conforming to the axis line. An end of the cut-out hole is blocked by an end surface of the extension portion.

2 Claims, 8 Drawing Sheets

(56) References Cited

U.S. PATENT DOCUMENTS

2016/0197530 A1* 7/2016 Fujii .................. H02K 5/225
                                                    417/423.7

FOREIGN PATENT DOCUMENTS

| JP | 2001-268862   | 9/2001  |
|----|---------------|---------|
| JP | 2001-268862 A | 9/2001  |
| JP | 2011-217455   | 10/2011 |
| JP | 2011-217455 A | 10/2011 |
| JP | 6286617 B2    | 2/2018  |

* cited by examiner

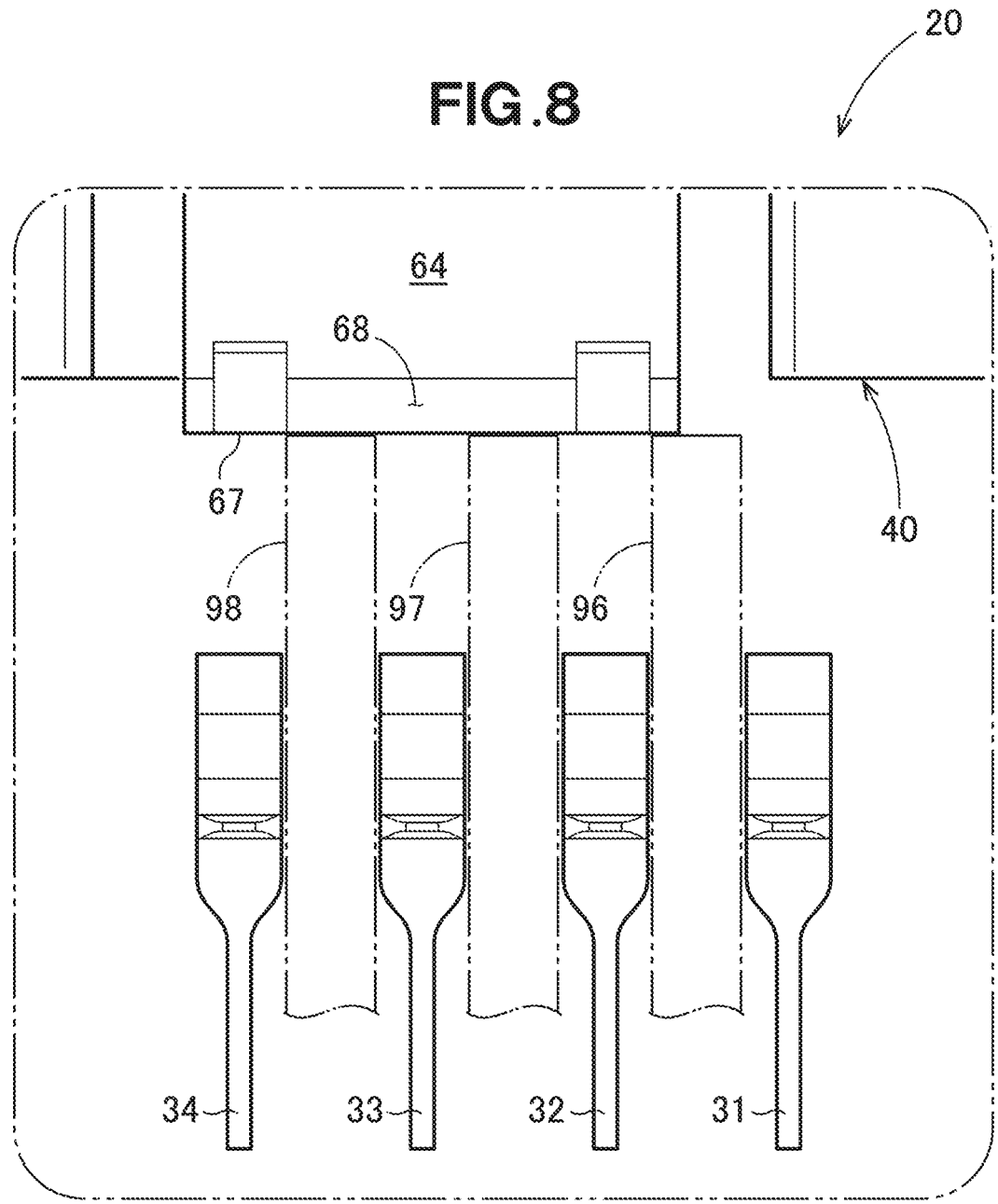

STATOR FOR MOTOR

TECHNICAL FIELD

A stator for a motor including a stator body sealed by resin.

BACKGROUND

A known stator for a motor includes a stator body sealed by a sealing member made of resin. When a stator body is sealed with melted resin, pressure is applied to the stator body. This pressure may deform the stator body. Known technology for suppressing the pressure-induced deformation of a stator body when a resin molding is performed are described in JP 2011-217455A and JP 2001-268862A.

In the technology described in JP 2011-217455A, a stator body includes a core, an insulator attached to the core, and a coil wound around the insulator. The insulator includes an annular outer circumferential portion, a plurality of arm portions extending from the outer circumferential portion toward the axial center, and an inner circumferential portion formed at the ends of the arm portions.

The stator body further includes an annular reinforcing member that reinforces the insulator. The diameter of the reinforcing member is equivalent to the inner diameter of the insulator. The reinforcing member is in contact with the inner circumferential portion. With this configuration, when the resin molding is performed and pressure is applied to the stator body, the deformation of the stator body can be suppressed.

In the technology described in JP 2001-268862A, a protrusion portion is formed on a bottom surface of a sealing member mold. When a stator body is placed in the mold, the protrusion portion comes into contact with an outer circumferential portion of an insulator. That is, the outer circumferential portion is supported by the protrusion portion. This can prevent the stator body from expanding radially outward when the resin molding is performed.

SUMMARY

The technology of JP 2011-217455A includes the reinforcing member that reinforces the insulator, increasing the number of parts. The technology of JP 2011-268862A requires that a new mold be made that includes the protrusion portion that can support the outer circumferential portion of the insulator. In both cases, the cost of manufacturing the stator increases.

The object is to provides technology that suppresses the deformation of a stator body sealed by a sealing member made of resin and suppresses cost.

An embodiment according to claim 1 is a stator for a motor, including
an annular stator body including a core, an insulator attached to the core, and a coil wound around the insulator;
a plurality of terminals able to electrically connect to the stator body; and
a sealing member that is made of resin, the sealing member sealing the stator body and the plurality of terminals; wherein
the insulator includes an extension portion that extends from a portion of a circumferential wall portion of the insulator toward the plurality of terminals conforming to an axis line of the stator;
the sealing member includes a cut-out hole in between an adjacent pair of the plurality of terminals, the cut-out hole being a through-hole extending conforming to the axis line of the stator; and
an end of the cut-out hole is blocked by an end surface of the extension portion.

In an embodiment according to claim 2, preferably the sealing member includes a plurality of exposed holes from which the stator body is exposed; and the end surface of the extension portion is centrally located between a pair of the plurality of exposed holes adjacent in a circumferential direction.

Typically, the cut-out hole is formed in the sealing member made of resin that seals the stator body and the plurality of terminals between adjacent terminals. To form the cut-out hole, a column-shaped pin is formed on the mold for forming the sealing member.

According to claim 1, the cut-out hole formed between the terminals is a through-hole. One end of the cut-out hole is blocked by the end surface of the extension portion of the insulator. This means that, when the stator body is placed in the mold, the end surface of the extension portion of the insulator is in contact with the pin for forming the cut-out hole. Accordingly, the insulator is supported by the pin for forming the cut-out hole when a resin molding is performed.

In other words, a portion of the insulator extends such that the pin for forming the cut-out in the mold can support the insulator. This allows the pin for forming the cut-out to support the insulator when the stator body is placed in the mold. The stator body is supported by more portions.

As a result, the number of parts for reinforcing the insulator is not required to be increased, and the mold is not required to be changed. The resin molding-induced deformation of the stator body can be suppressed, and cost can be suppressed.

According to claim 2, the sealing member includes a plurality of exposed holes from which the stator body is exposed. The end surface of the extension portion is centrally located between two of the exposed holes adjacent in the circumferential direction.

The portion exposed from the exposed hole is the portion supported by the mold when the resin molding is performed. The end surface of the extension portion is centrally located between these supported portions. Thus, the stator body is evenly supported when the resin molding is performed. This allows deformation of the stator body to be more reliably suppressed.

BRIEF DESCRIPTION OF THE DRAWINGS

FIG. 8 is an explanatory diagram of the configuration of the stator body placed in a mold and pins of the mold.

DETAILED DESCRIPTION OF THE PREFERRED EMBODIMENTS

Figure 1:
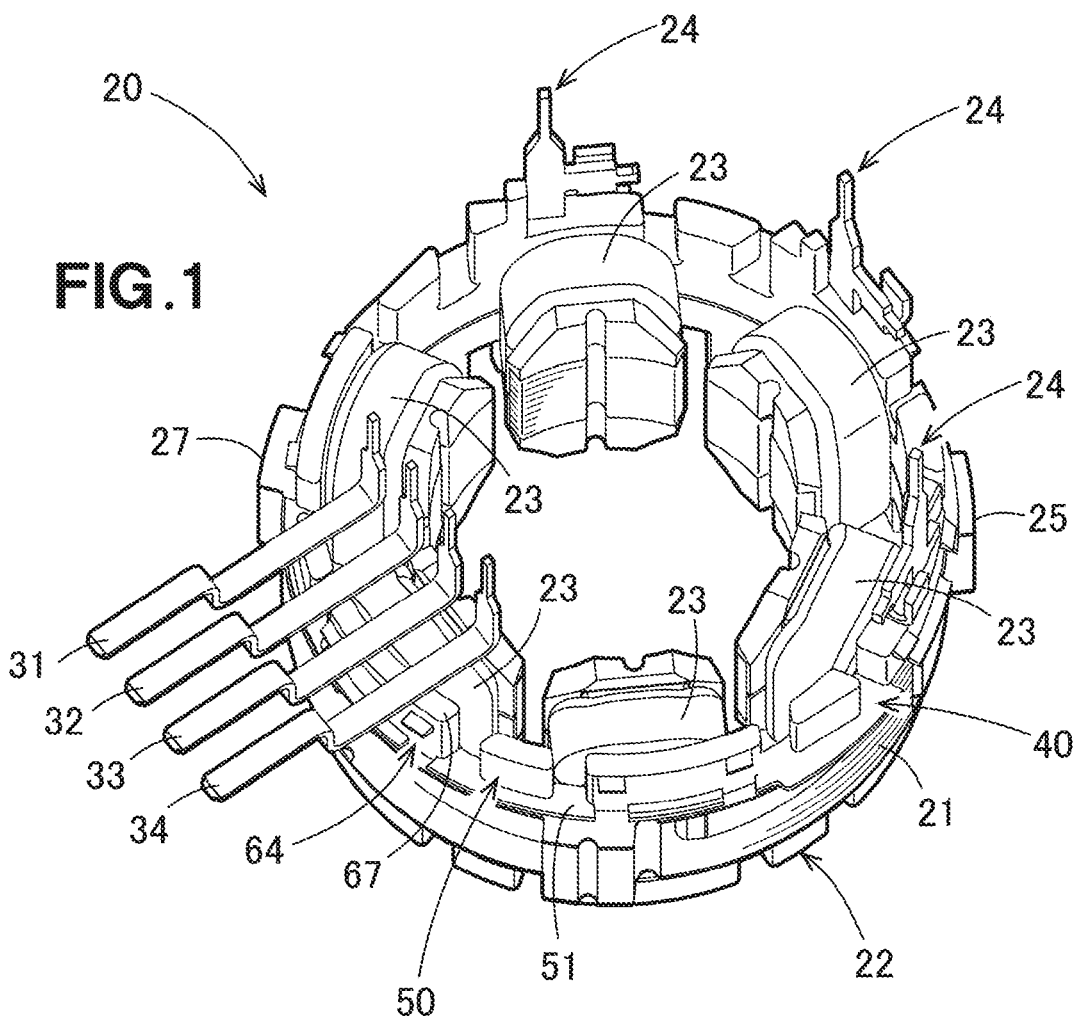
FIG. 1 is a perspective view of a stator body sealed by a sealing member made of resin of a stator for a motor according to an example.

In the following description, for purpose of explanation, numerous specific details are set forth in order to provide a thorough understanding of disclosed embodiment. It will be apparent, however, that one or more embodiments may be practiced without these specific details. In other instances, well-known structures and devices are schematically shown in order to simplify the drawing. The embodiments will be described below with reference to the attached drawings.

EXAMPLE

FIG. 1 illustrates a stator body 20, with an annular shape, sealed by a sealing member 11 made of resin of a stator 10 for a motor (see FIG. 3) according to an example, and four outer terminals 31 to 34.

The stator body 20 includes a core 21 formed of a number of layered electromagnetic steel plates; a first insulator 40 attached to one surface of the core 21; a second insulator 22 attached to the other surface of the core 21, sandwiching the core 21 with the first insulator 40; six coils 23 to 23 wound around the first insulator 40 and the second insulator 22, and three inner terminals 24 to 24 inserted into the first insulator 40.

The inner terminals 24 to 24 are each able to connect with the nearby coils 23 to 23. The ends of the inner terminals 24 to 24 project and are able to be inserted in a substrate (not illustrated).

The outer terminals 31 to 34 are, for example, connected to a power supply equipment. The ends of the outer terminals 31 to 34 project and are able to be inserted in a substrate. A detailed description of the electrical connections between the coils 23 to 23, the inner terminals 24 to 24, the outer terminals 31 to 34, and the substrate will be omitted.

Figure 2:
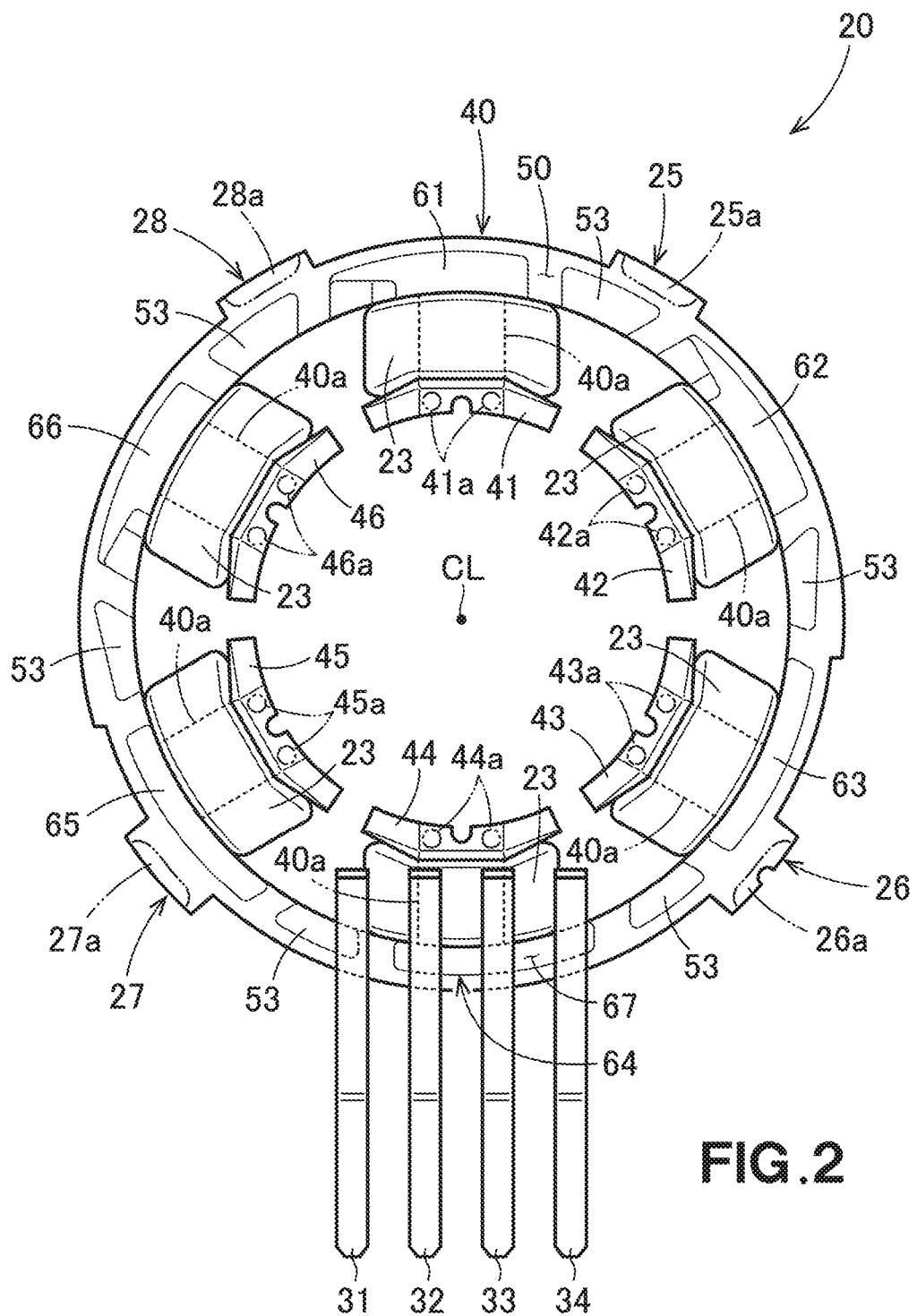
FIG. 2 is a plan view of the stator body illustrated in FIG. 1.

FIGS. 1 and 2 will now be referred to. The first insulator 40 includes an annular outer circumferential portion 50 (circumferential wall portion 50), six arm portions 40a that extend from the outer circumferential portion 50 toward an axis line CL of the stator body 20, and first to sixth inner circumferential portions 41 to 46 formed on the ends of the arm portions 40a.

The outer circumferential portion 50 includes a thin plate-shaped annular portion 51, first to sixth long wall portions 61 to 66 formed on the annular portion 51 discontinuously in the circumferential direction, and six short wall portions 53 to 53 formed between the first to sixth long wall portions 61 to 66.

The core 21 includes a first outer edge portion 25 that extends radially outward from a portion of the outer circumferential edge. In a similar manner, the core 21 includes three second to fourth outer edge portions 26 to 28 that extend radially outward from a portion of the outer circumferential edge.

Figure 3:
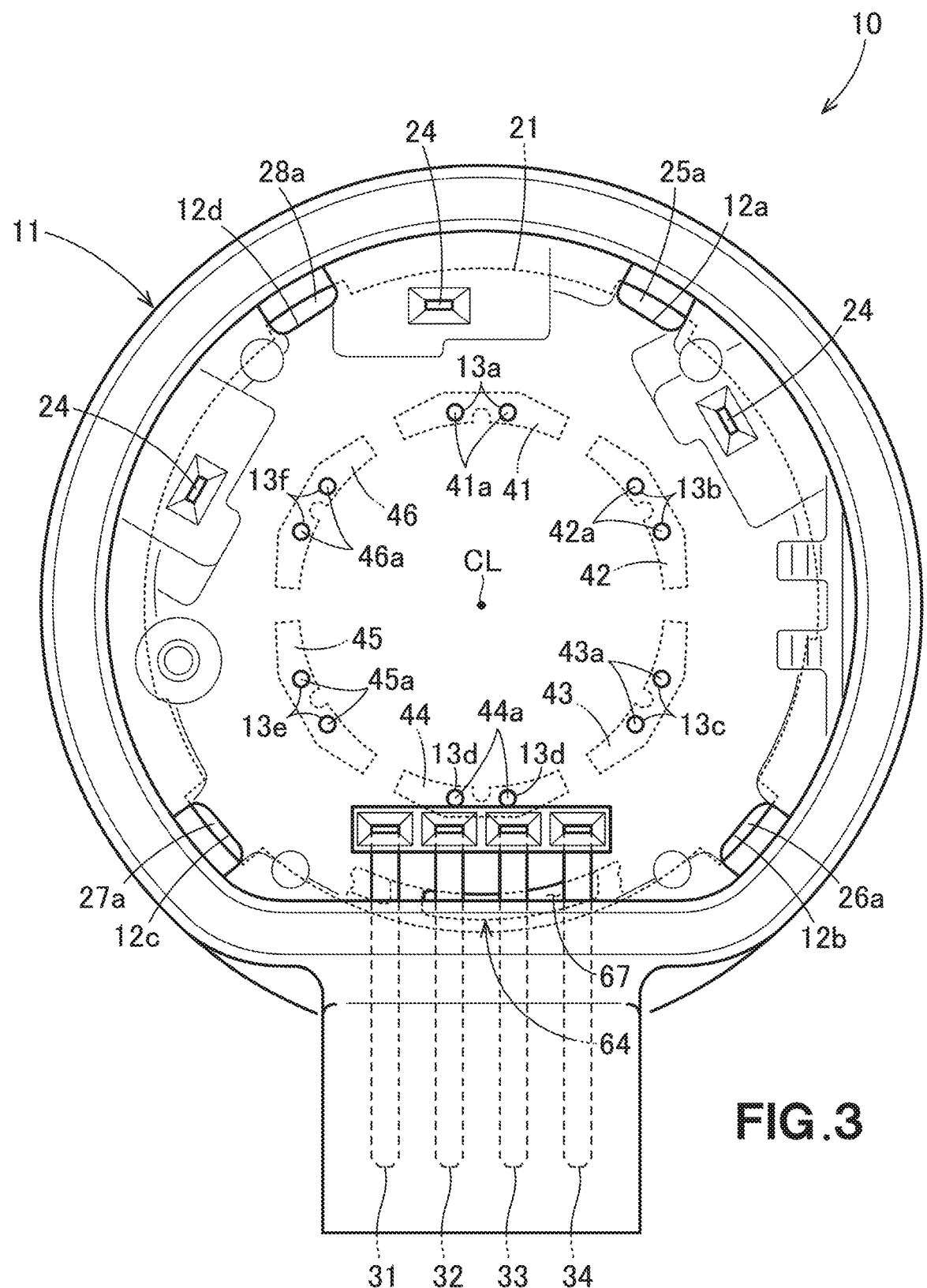
FIG. 3 is a plan view of the stator for a motor with the stator body illustrated in FIG. 1 sealed.

FIGS. 2 and 3 will now be referred to. The sealing member 11 includes a first long hole 12a (exposed hole 12a). A first outer edge exposed portion 25a, which is a portion of the first outer edge portion 25, is exposed from the first long hole 12a.

In a similar manner, the sealing member 11 includes second to fourth long holes 12b to 12d (exposed holes 12b to 12d). Second to fourth outer edge exposed portions 26a to 28a, which are portions of the second to fourth outer edge portions 26 to 28, are respectively exposed from the second to fourth long holes 12b to 12d.

Additionally, the sealing member 11 includes first to sixth circular holes 13a, 13a to 13f, 13f arranged in a circle. First to sixth inner wall exposed portions 41a to 46a, which are the portions of the first to sixth inner circumferential portions 41 to 46, are exposed from the first to sixth circular holes 13a, 13a to 13f, 13f.

A portion of an end surface 67 of the fourth long wall portion 64 is exposed from the sealing member 11. The end surface 67 is centrally located between the circumferentially adjacent second long hole 12b and third long hole 12c.

Figure 4:
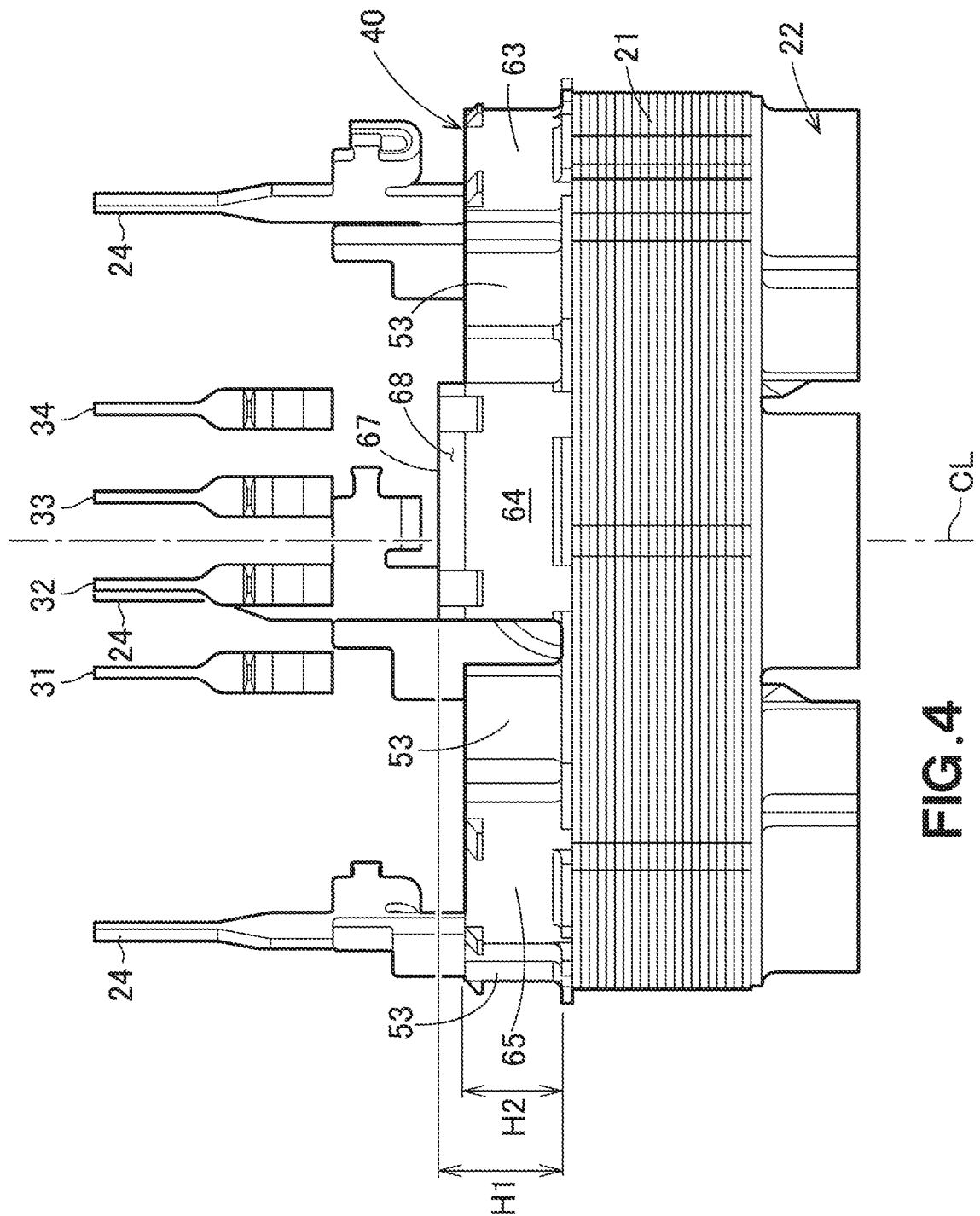
FIG. 4 is a side view of the stator body illustrated in FIG. 1.

FIG. 4 will now be referred to. The fourth long wall portion 64 includes an extension portion 68 that extends toward the second to fourth outer terminals 32 to 34 conforming to the axis line CL of the stator body 20. That is, a height H1 of the fourth long wall portion 64 is greater than a height H2 of the surrounding wall portions 53, 63, 65 in the direction of the axis line CL.

Figure 5:
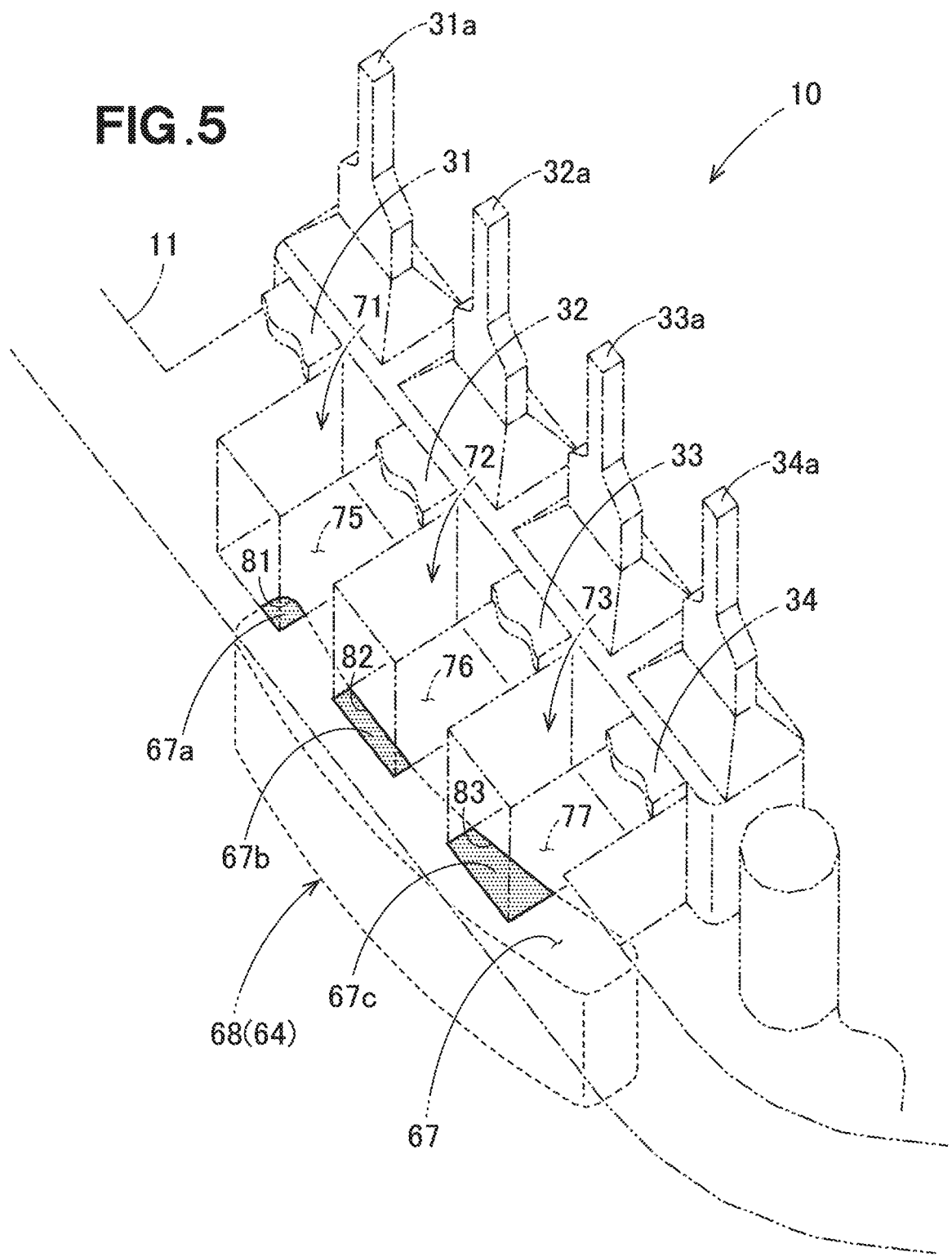
FIG. 5 is a perspective view of the region around terminals of the stator for a motor illustrated in FIG. 3.
Figure 6:
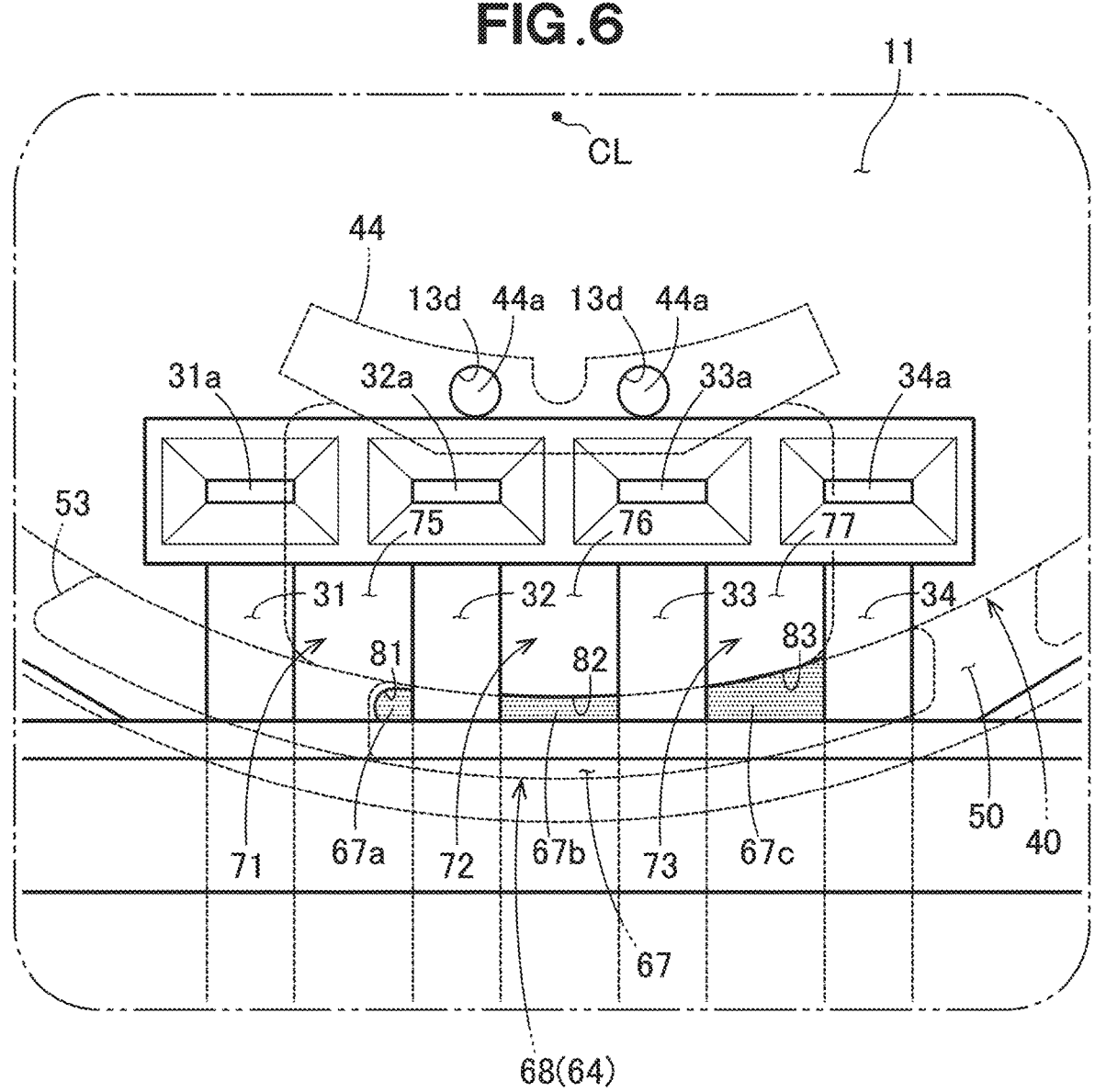
FIG. 6 is a plan view of the region around the terminals of the stator for a motor illustrated in FIG. 3.

FIGS. 5 and 6 will now be referred to. The sealing member 11 includes first to third cut-out holes 71 to 73 located between the adjacent first to fourth outer terminals 31 to 34. The first to third cut-out holes 71 to 73 have a quadrangular prism shape and extend conforming to the axis line CL of the stator body 20.

First to third bottom portions 75 to 77 of the first to third cut-out holes 71 to 73 penetrate through at a portion in each bottom portion and respectively include first to third through-holes 81 to 83. The first to third through-holes 81 to 83 are blocked by the end surface 67 of the extension portion 68.

A first end portion 67a, which is a portion of the end surface 67, is exposed from the first through-hole 81. In a similar manner, a second end portion 67b is exposed from the second through-hole 82, and a third end portion 67c is exposed from the third through-hole 83.

Figure 7:
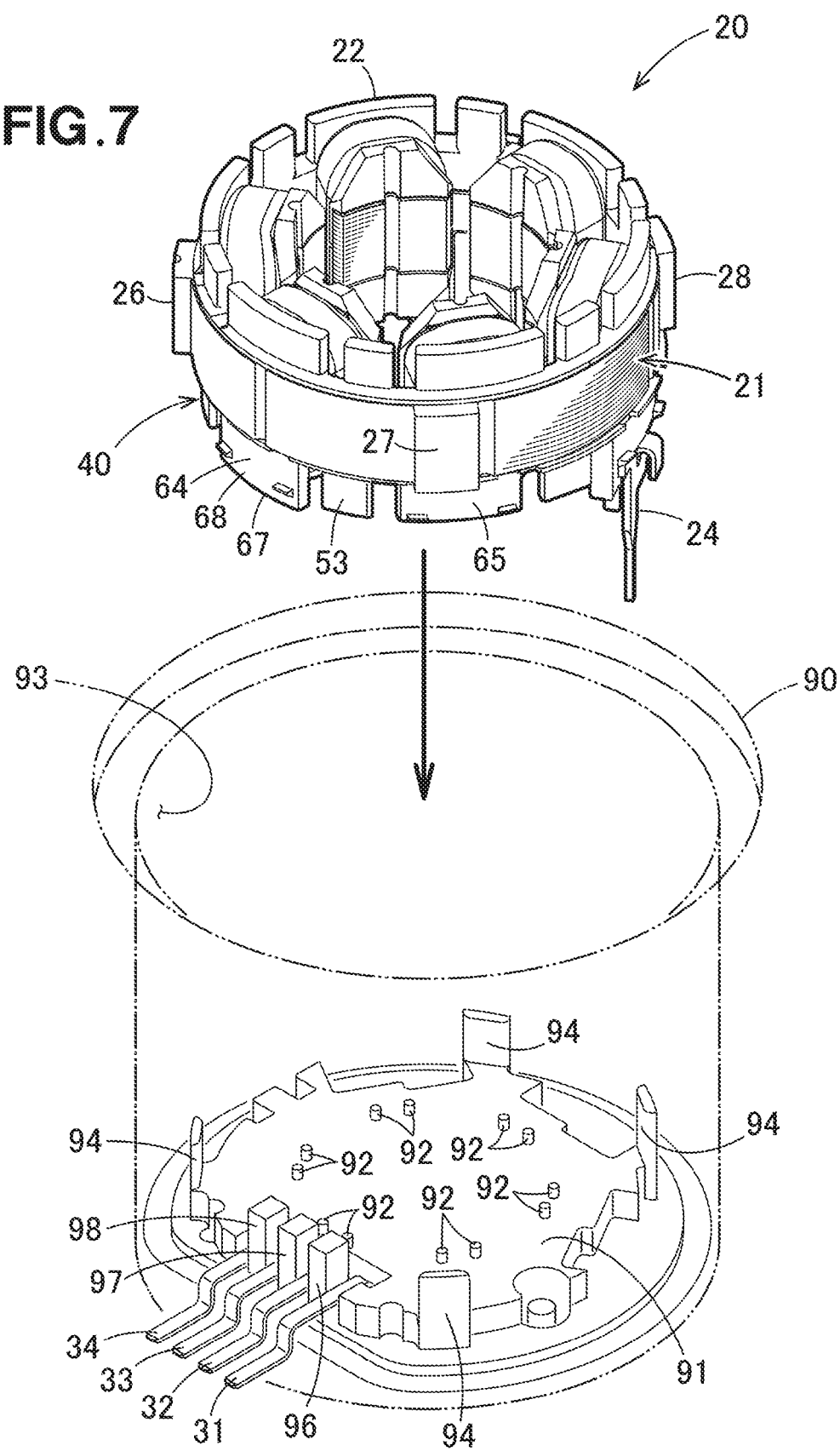
FIG. 7 is an explanatory diagram of the process of sealing the stator body illustrated in FIG. 1 with a sealing member.

FIG. 7 will now be referred. The sealing of the stator body 20 using a mold 90 will now be described.

The mold 90 in which the stator body 20 is placed has a cylindrical shape. Twelve first support portions 92 are formed on a bottom portion 91 of the mold 90. The first support portions 92 project upward from the bottom portion 91. The first support portions 92 to 92 are able to support the first to sixth inner circumferential portions 41 to 46 (FIG. 2) of the first insulator 40.

Furthermore, four second support portions 94 to 94 are formed on the bottom portion 91 near the side surface 93 of the mold 90. The second support portions extend upward. The second support portions 94 to 94 are able to support the first to fourth outer edge portions 25 to 28 (FIG. 2) of the core 21.

Additionally, first to third pins 96 to 98 are formed on the bottom portion 91 for forming the first to third cut-out holes 71 to 73 (FIG. 5).

The process of sealing the stator body 20 using the mold 90 will be described next.

Firstly, the first to fourth outer terminals 31 to 34 are placed on the bottom portion 91 of the mold 90. The first to third pins 96 to 98 are arranged between the adjacent first to fourth outer terminals 31 to 34.

Next, the stator body 20 is placed in the mold 90 with the fourth long wall portion 64 of the first insulator 40 positioned above the first to third pins 96 to 98. Thereafter, resin is fed into the mold 90 and sealing is performed.

Next, effects of the example will be described.

FIGS. 5 and 6 will now be referred. The sealing member 11 includes first to third cut-out holes 71 to 73 located between the first to fourth outer terminals 31 to 34. The first to third cut-out holes 71 to 73 are through-holes. The first to third through-holes 81 to 83 are blocked by the end surface 67 of the extension portion 68 of the fourth long wall portion 64.

FIG. 8 will now be referred to. It is illustrated that, in the configuration illustrated in FIGS. 5 and 6 described above, with the stator body 20 placed in the mold 90, the end surface 67 of the extension portion 68 is in contact with the first to third pins 96 to 98. Accordingly, when the sealing member 11 (FIG. 3) is molded, the stator body 20 is supported by the first to third pins 96 to 98.

FIG. 7 will now be referred to. The stator body 20 is supported by the first support portions 92 to 92 and the second support portions 94 to 94. The stator body 20 is also supported by the first to third pins 96 to 98 for forming the cut-out holes 71 to 73. As a result, the resin molding-induced deformation of the stator body 20 can be suppressed without increasing the number of parts and without changing the mold 90.

As described above, the portion with which the first to third pins 96 to 98 come into contact is the end surface 67 of the extension portion 68. The end surface 67 is separated from the coil 23 by the extending dimension (H1-H2 (see FIG. 4)). This allows, when the first to third pins 96 to 98 support the stator body 20, the first to third pins 96 to 98 not to come into contact with the coil 23 near the fourth long wall portion 64.

FIG. 3 will now be referred to. The end surface 67 of the fourth long wall portion 64 is centrally located between the circumferentially adjacent second long hole 12b and third long hole 12c. This allows the stator body 20 to be evenly supported by second support portions 94, 94 and the first to third pins 96 to 98 centrally located between the second support portions 94, 94 when the resin molding is performed. As a result, the deformation of the stator body 20 can be more reliably suppressed.

REFERENCE SIGNS

10 . . . Stator for a motor
11 . . . Sealing member
12a to 12f . . . Long hole
13a to 13f . . . Circular hole
20 . . . Stator body
21 . . . Core
22 . . . Second insulator
23 . . . Coil
25 to 28 . . . First to fourth outer edge portion
25a to 28a . . . First to fourth outer edge exposed portion
31 to 34 . . . First to fourth outer terminal
40 . . . First insulator
41 to 46 . . . First to sixth inner circumferential portion
41a . . . Inner wall exposed portion
50 . . . Outer circumferential portion
51 . . . Annular portion
53 . . . Short wall portion
61 to 66 . . . First to sixth long wall portion
67 . . . End surface
68 . . . Extension portion
71 to 73 . . . First to third cut-out hole
75 to 77 . . . First to third bottom portion
81 to 83 . . . First to third through-hole
90 . . . Mold
92 . . . First support portion
94 . . . Second support portion
96 to 98 . . . First to third pin
CL . . . Axis line

What is claimed is:

1. A stator for a motor, comprising:
an annular stator body comprising a core, an insulator attached to the core, and a coil wound around the insulator;
a plurality of terminals able to electrically connect to the stator body; and
a sealing member that is made of resin, the sealing member sealing the stator body and the plurality of terminals; wherein
the insulator comprises an extension portion that extends from a portion of a circumferential wall portion of the insulator toward the plurality of terminals conforming to an axis line of the stator;
the sealing member comprises a cut-out hole in between an adjacent pair of the plurality of terminals, the cut-out hole being a through-hole extending conforming to the axis line of the stator; and
an end of the cut-out hole is blocked by an end surface of the extension portion.

2. The stator for a motor according to claim 1, wherein
the sealing member comprises a plurality of exposed holes from which the stator body is exposed; and
the end surface of the extension portion is centrally located between a pair of the plurality of exposed holes adjacent in a circumferential direction.

* * * * *